Aug. 24, 1948.　　R. A. MILLHOLLAND ET AL　　2,447,955
ARC WELDING SYSTEM
Filed Sept. 20, 1944　　　　　　　　　　　　　　2 Sheets-Sheet 1

INVENTORS.
RAYMOND A. MILLHOLLAND
WILBUR F. SULLY.
BY
Lockwood, Goldsmith & Galt,
ATTORNEYS.

Aug. 24, 1948.    R. A. MILLHOLLAND ET AL    2,447,955
ARC WELDING SYSTEM
Filed Sept. 20, 1944    2 Sheets-Sheet 2
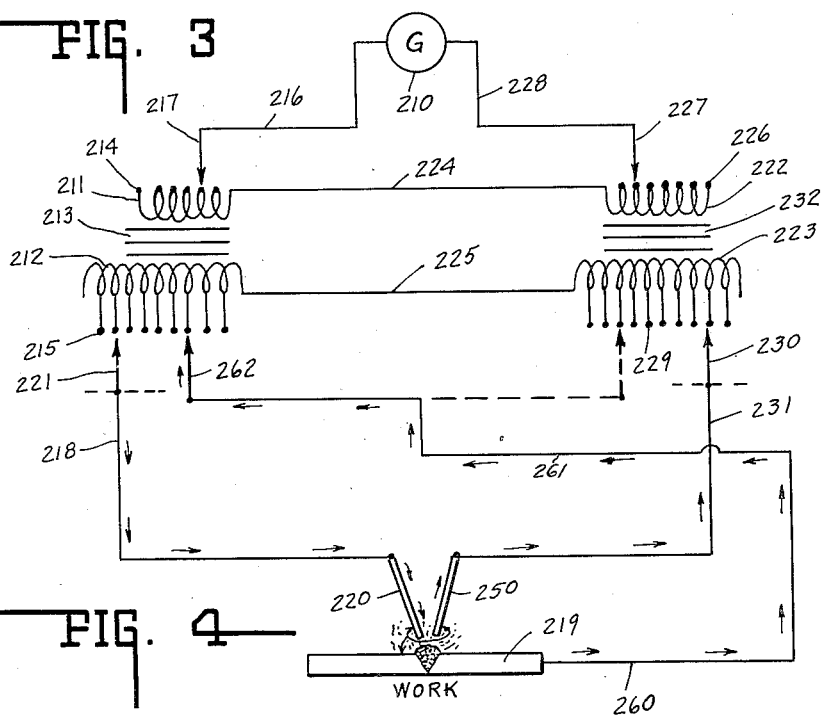
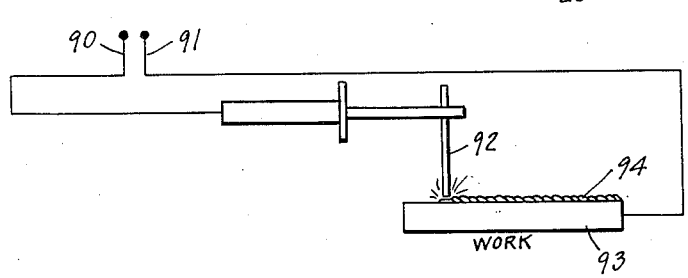
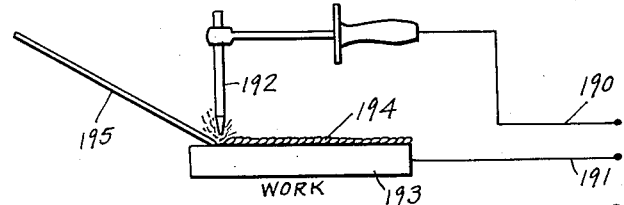
INVENTORS.
RAYMOND A. MILLHOLLAND.
BY WILBUR F. SULLY.
Lockwood, Goldsmith & Galt.
ATTORNEYS.

Patented Aug. 24, 1948

2,447,955

UNITED STATES PATENT OFFICE 2,447,955

ARC WELDING SYSTEM

Raymond A. Millholland and Wilbur F. Sully,
Indianapolis, Ind.

Application September 20, 1944, Serial No. 554,895

4 Claims. (Cl. 315—277)

This invention relates to an arc welding system.

The chief object of this invention is to provide apparatus for and to utilize a method of alternating current arc welding offering many advantages, not the least of which is that household fuse protection (usually 30 amperes) is ample for protection if the electrode utilized is one-eighth inch rod or less.

The chief feature of the invention resides in the production in an alternating current arc welding system of a voltage droop when the current increases across the arc and a relatively instantaneous recovery of potential as the current across the arc decreases possibly explained as follows: The rapid recovery of potential may be due to the fact that it is a function of the phase shifting of the voltages and the mutual reactivity of the windings.

Another feature of the present invention resides in utilizing in effect two transformers having independent cores, or a common core as desired, but which have their primaries connected in series and their secondaries connected in series, each winding preferably but not necessarily having a plurality of taps. The foregoing permits utilization of transformers having good design and maximum efficiency at a high power factor; and the system further contemplates the elimination of large iron losses due to high reluctance and the operation at a comparatively low power factor heretofore associated with conventional alternating current arc welding systems and particularly those utilizing a high reluctance magnetic core.

Another feature of the invention is that it requires an open circuit voltage of but from 10 to 25 volts less than now is required by present alternating current welders utilizing a like electrode upon similar work to strike and maintain an arc between a metal electrode and the work.

Another feature of the invention (and partially suggested above) is that consistently with the invention herein disclosed it has been possible to maintain a welding current of above 75 amperes across the arc while actually drawing not more than 25 amperes from the source at 120 volts alternating current constant potential, with an accompanying power factor in excess of eighty per cent (80%) and usually about ninety per cent (90%).

A still further feature of the multiple tap embodiment of the invention resides in the varying the ampere-turn ratio between each pair of primary and secondary windings and also varying the turn ratios between pairs of primary and secondary windings whereby there is obtained the necessary droop and subsequent substantially instantaneous recovery in arc welding voltage to maintain a satisfactory welding arc.

Other objects and features of this invention will be set forth more fully hereinafter.

The full nature of the invention will be understood from the accompanying drawings and the following description and claims.

In the drawings:

Fig. 3 is a similar illustration of a third embodiment of the invention and wherein a portion of the arc current is utilized for work heating purposes.

Fig. 4 is a schematic illustration of a bead welding arrangement wherein the electrode deposits the bead.

Fig. 5 is a similar illustration of a bead welding arrangement wherein a single carbon arc and filler rod are utilized for bead welding purposes.

Before proceeding to a detailed description of the invention, the following is to be noted. Unlike ordinary electrical loads, such as motors, lamps, heaters and the like, which never cause short circuits unless something is wrong, a welding arc continually causes short circuits with normal operation. Published research discloses that with some types of electrodes, molten drops of weld metal crossing the arc may cause electrical short circuit as often as twenty times or more per second. Touching the electrode to the work to strike the welding arc also causes a short circuit. During these frequent instances of short circuiting, the electrical resistance of the welding circuit falls so low that unless the transformer provides instant reaction to prevent it, an excessive surge of current will flow in the secondary circuit in each instance of short circuit. This draws an increased current in the primary circuit. Heretofore, such increased primary currents have precluded household use.

The present invention has inherent in it a compensating or neutralizing function insofar as the production of excessive primary current is concerned. It appears, however, the mutual reactivity of the system is such that the secondary circuit has occurring therein exceptionally high peak current and with a sufficient mean effective current for the required purpose.

Figure 1:
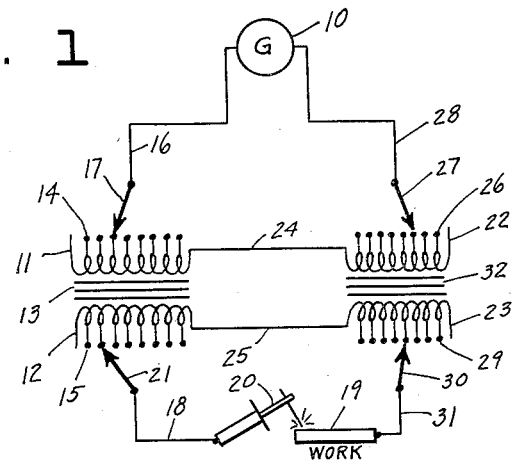
Fig. 1 is a diagrammatic illustration of one form of the invention wherein two independent transformer units are utilized, each winding having taps thereon.

Herein, see Fig. 1, 10 indicates a source of alternating current as at 120 volts. 11 indicates a primary winding of a transformer having secondary winding 12 and core 13. Winding 11 has taps 14 and winding 12 has taps 15.

Line 16 connects at one end to supply 10 and at the other end to adjustable contact 17 arranged for selective connection to one of the taps 14. Line 18 may connect to the work 19 or the arc forming member (metal electrode or carbon electrode) 20. Herein the latter is so connected. Line 20 also is connected to adjustable contact 21 arranged for selective connection to one of the taps 15.

A primary winding 22 is connected at one end by line 24 to an end of winding 11 so that the primaries are series connected. A secondary winding 23 is connected at one end by line 25 to one end of secondary 12 so that the secondaries also are series connected.

Primary 22 has taps 26 selectively engageable by adjustable contact 27 connected by line 28 to the other side of the source 10. Secondary 23 has taps 29 selectively engageable by adjustable contact 30 connected by line 31 to the work or electrode not connected to line 18, and herein to work 19. Core 32 is associated with primary 22 and secondary 23.

The aforesaid taps and adjustable contacts permit of adjustment for varying ampere-turn ratios aforesaid and the induced voltage or current of the arc circuit or both of the series connected secondary windings to that required or desired.

In the foregoing example if the alternating current source 10 is at a voltage of 120 volts applied directly across the series connected primaries 11 and 22, this voltage can be divided by the operator unequally between said primaries in a predetermined ratio by means of tap contact variation, and a secondary or welding voltage will be induced in the series connected secondaries 12 and 23, causing a proportionate unequal division of voltage between the two secondaries.

When the arc between terminal 20 and work 19 is in operation, the demagnetizing effect of the secondary windings 12 and 23 upon the two cores 13 and 32 may be unequal, due to the fact that although the same number of amperes of current flow in each primary winding 11 and 22, the number of turns in each may not be the same, hence, the ampere-turn effect of each may not be equal.

This unequal demagnetizing effect on the two cores 13 and 32 apparently causes a phase shift in the voltage relationship of the primaries 11 and 22, the degree of which phase shift varies according to the extent of the welding current flowing across the arc gap between members 19 and 20.

By tapping the various primary and secondary windings in proper relationship, this phase shifting can be made to cause any desired droop in the secondary voltage when a short circuit occurs and to provide substantially instantaneous recovery of voltage when no short circuiting is taking place.

Figure 2:
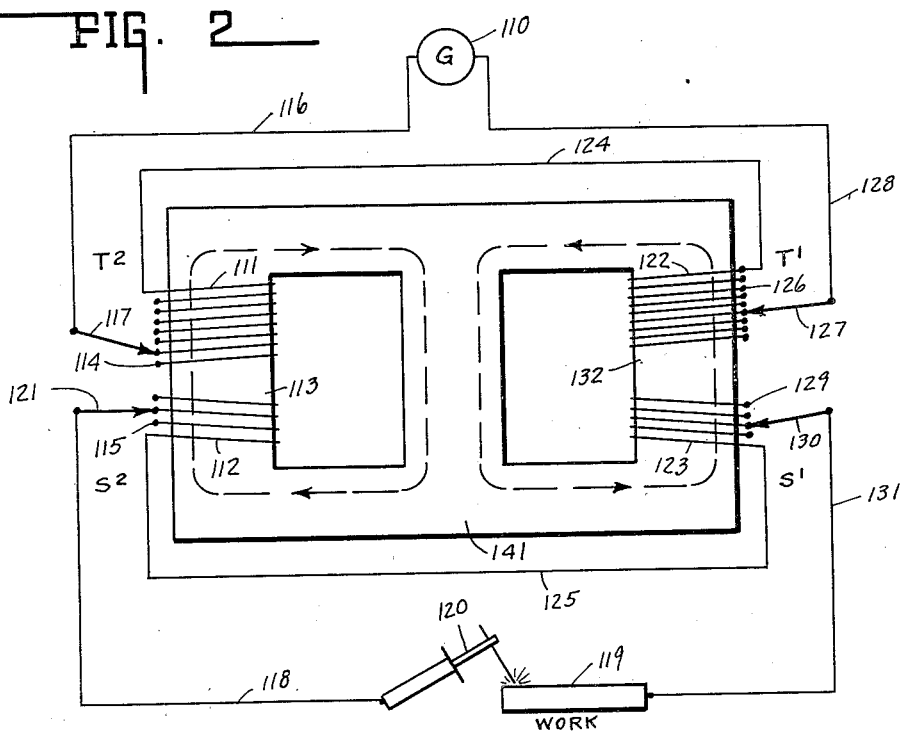
Fig. 2 is a schematic illustration of another embodiment of the invention wherein the several windings of the two transformers are associated with a common core.

Reference will now be had to Fig. 2 wherein there is illustrated the same invention as illustrated in Fig. 1, but herein the two cores 13 and 32 of Fig. 1 embodiment are combined into a core having a central leg and two outside legs all connected together as illustrated in Fig. 2.

Herein numerals of the one hundred series indicate parts identical or similar to parts illustrated in Fig. 1 and designated by the corresponding numerals of the primary series. Herein cores 113 and 132 are joined at the top and bottom by core portions 140 and 141 and therebetween and connected thereto is the middle leg 142 of said closed core. The same electrical effects previously described are obtained with this form.

Note that herein the primary coils as well as the secondary coils are on the outer legs and the various magnetic circuits are complete and are of low reluctance and the device operates on the standard portion of the saturation curve for normal operation, best operation being obtainable when the core is operating at the midportion of the curve.

Note that in Fig. 2 the number of turns in the primary 122 exceeds that of primary 111 and similarly the number of turns in the secondary 123 exceeds that in secondary 112. Hence, herein the right hand coils comprise the main transformer and the left hand coils the auxiliary transformer which might be said to have a swing, tickler or feed back function relative to the main transformer.

In Fig. 3 numerals of the 200 series indicate correspondingly herein parts similar or identical to those correspondingly indicated in Figs. 1 and 2 by the primary series or same increased by one hundred. This form differs from both in that herein line 231 connects to a second electrode 250 juxtapositioned to electrode 220, both being of carbon arc type and forming an arc therebetween immediately adjacent the work 219.

A line 260 herein connects by line 261 to adjustable contact 262 that can selectively engage tap contacts 215 or 229 as desired or required. When this connection is omitted contact 230, adjustable relative to tap contacts 229, completes the arc circuit with the arc flame between electrodes 220 and 250. When line 260 is used, contact 230 may be still adjustable, but in addition to the aforesaid operation part of the arc current now crosses to the work and heats the same thereby facilitating welding in such cases. This arrangement is in effect a three-wire circuit.

When this type is employed, heavier work sections than normally used can be welded, the speed of welding is increased and the soundness of the welded joint has been found to be improved.

In Fig. 4, lines 90 and 91, are assumed to lead from series connected secondaries, and to the electrode 92 and work 93 respectively to form bead 94 by metal deposited from electrode 92.

In Fig. 5, lines 190 and 191 are assumed to lead from series connected secondaries and to the carbon electrode 192 and work 193. The bead 194 is formed by the arc between the work and electrode melting the filler rod 195. The foregoing constitute but two practical applications of the invention and illustrate the fact that the electrode may be of the metal supplying type or of arc only forming type.

By way of explanation, an unusual electrical action has been observed in the simple form of the invention (see Fig. 1) when current is flowing across the welding arc. For example, an impressed voltage of 120 volts may be divided into 90 volts for one primary and 30 volts for the other primary. Likewise, the induced secondary voltages may be divided as 20 volts for one secondary and 18 volts for the other secondary. With the circuit appropriately adjusted to the turn ratios to secure such voltages and before any current is flowing across the arc gap, the total welding voltage under secondary open circuit conditions will be approximately the arithmetical sum of the induced voltages of the two secondary windings because the current flowing in the primaries is substantially in the same phase.

However, the instant the arc is struck and current flows across the arc gap, the voltage across the arc will droop proportionate to the current flowing in the secondaries, but at that same instant the voltage across the terminals of the two secondary windings will rise, and this tendency for the two voltages to rise can be greatly accentuated by proper manipulation of the secondary turn ratios in relation to the turn ratios of the primary windings.

Under the aforesaid identical initial voltage conditions, the voltage readings of the two primary windings will also rise the instant the arc is struck, so that the arithmetical sum of the voltage readings of the two primaries then will be greater than the impressed primary circuit voltage, which in this example is 120 volts. Similarly, the arithmetical sum of the induced voltages will be found to be measurably greater than the total voltage reading across the arc.

Variations of this phenomenon can be affected by changing the turn ratios of the primary and secondary windings to produce readings on one or all of the individual primary and secondary windings which will show a droop in voltage or no change in voltage readings between open secondary circuit voltage and when current is flowing across the arc gap.

The discrepancy between the arithmetical sum of the voltage readings for either the primary or secondary windings in relation to their respective total observed voltage may be caused by a shift in phase angle in the two voltages measured across the terminals of each pair of windings. The exact cause is not known at this time.

It has been further observed that the voltage readings of all four windings tend to rise when the arc is struck and the resultant arc is steady and the electrode is melted at a uniform rate and without excessive spatter, also that the arc is not inclined to break but continues even though the arc gap is measurably lengthened. Under this condition, also, it is easier to strike an arc between the work and a metal electrode than it would be without the assistance of this electrical effect.

Since the arc of carbon or welding rod type herein is so regular it will be apparent that this invention is peculiarly adapted for arc lighting such as projector use and all with the variations occurring therein.

Samples of work, particularly on light gauge sheet metal, are of a character equal or better than heretofore obtainable with direct current welding systems heretofore exclusively used for this type of work.

Substantiating the theory that there is a definite phase shift between the two primary and between the two secondary voltages so that proper selection of the necessary turns in each transformer will produce the desired phase shift condition, which is most beneficial to welding, the following optimum example is given from an actual test (49-A).

If in Fig. 1 the current in the primary circuit is I, and that in the secondary circuit when the arc is in operation is $I_2$, and the number of turns in winding 11 is 66 turns, in winding 22 is 44 turns, in winding 12 is 20 turns and in winding 23 is 16 turns, all of like wire and size, and cores 13 and 32 are substantially identical, then at no load if the voltage across primary 11 is 72 volts and across primary 22 is 43 volts, the voltage across secondary 12 will be 22 volts and the voltage across secondary 23 will be 16 volts.

With this set up if an arc is struck the value of the current in the primary circuit will be 20 amperes at 105 volts, the vector resultant of 102 volts across winding 11 and 50 volts across winding 22, or rather so much of same as is tapped in. At the same time the required arc is 60 amperes which is at 28 volts the vector sum of 25 volts across winding 12 and 18½ volts across winding 23.

Note that between on-load and welding load the voltages across all windings rise. The phase shift is approximately 20 degrees and the power factor is 94 percent. All the phase difference between the primary voltages and that between the secondary voltages is in each case approximately 80 degrees.

The calculated power factor and observed power factor substantially coincided and the phase displacements also substantially coincided. Thus, secondary demand of 60 amperes at 28 volts is ample for welding because recovery is instantaneous as it were and the primary demand of 20 amperes at 105 volts is well within the underwriter's household protection limits so that every garage, etc. having household electric lighting service may safely use this welding instrument and the same delivers a good arc strike and the electrode is easy to manipulate while welding.

The extremely elastic arc, that is, one capable of being drawn out without rupture, is a very important feature of the electrical effect secured in its relation to good welding. To generalize: A short or brittle arc, especially in the hands of any but a highly skilled welder, produces unsound welds, due to the frequent interruptions of the arc while welding. Each interruption of the arc produces a crater in the weld which, unless it is skillfully filled upon restriking the arc, will leave a serious defect in the weldment. The necessity for restriking the arc also consumes considerable time and raises the direct labor cost of welding thereby. An elastic arc enables the operator to weld in awkward positions without breaking his arc, while under normal conditions he is able to maintain a higher rate of production than with a brittle arc which is difficult to control, at best. There is also a higher human fatigue factor when working with a brittle arc than when working with an elastic arc. Also, when the operator reaches the edge of a thin section where there is danger of burning through, he is able, with an elastic arc, to increase its length, thus reducing the concentration of heat upon the edge of the work. An elastic arc also enables the operator to shift readily his position and that of the electrode, easily make difficult corner turns and changes of welding direction without his arc breaking. There are, of course, certain conditions which may require the welder to maintain a short arc. Welding over head and in a vertical plane are instances. But even here the elastic arc has its advantages over the brittle arc source of welding current, enabling the operator to concentrate on doing a good job without the constant worry and nervous tension caused by attempting to hold his arc from breaking or rupturing while in a strained physical posture.

The use of a single transformer with two adjustable primary tapping connections and with two adjustable secondary tapping connections is disclaimed herefrom. Also disclaimed herefrom is the aforesaid wherein two cores are utilized, commonly termed an air gap transformer wherein the air gap usually is within the windings and may be of fixed or adjustable type.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A method of controlling a single phase alternating arc suitable for welding and like purposes comprising electrically connecting in series the primary windings of two transformers and connecting such connected windings across a source of single phase alternating current of constant potential, connecting in series the secondary windings of the transformers, the primaries and secondaries each being proportioned to the other so that the primary voltages are unequally divided between them in predetermined ratio and the resultant secondary voltages are unequally divided between them in another predetermined ratio, and utilizing a third conductor in the secondary circuit only for work preheating purposes and interposing the third conductor between one of the secondaries and the work.

2. Single phase alternating current operable arc controlling apparatus comprising a source of substantially constant, single phase, alternating current potential, and an arc forming electrode, in combination with a pair of cored transformers, means connecting the primary windings thereof in series, and means connecting the secondary windings thereof in series, the primaries being connected to the source and the secondaries being included in the arc circuit, the primary and secondary windings each being proportioned to the other so that the primary voltages are unequally divided between them in predetermined ratio and the resulting secondary voltages are unequally divided between them in another predetermined ratio.

3. Apparatus as defined by claim 2 wherein each winding has a plurality of taps.

4. Single phase alternating current operable arc controlling apparatus comprising a source of substantially constant, single phase, alternating current potential, and an arc forming electrode, in combination with a pair of cored transformers, means connecting the primary windings thereof in series, and means connecting the secondary windings thereof in series, the primaries being connected to the source and the secondaries being included in the arc circuit, the primary and secondary windings each being proportioned to the other so that the primary voltages are unequally divided between them in predetermined ratio and the resulting secondary voltages are unequally divided between them in another predetermined ratio, and a second arc forming electrode, the arc being included between the electrodes and in series therewith and conductor means connecting the work to be welded to the welding circuit in a three-wire arrangement by connecting the work to an intermediate portion of a series connected secondary.

RAYMOND A. MILLHOLLAND.
WILBUR F. SULLY.

REFERENCES CITED

The following references are of record in the file of this patent:

UNITED STATES PATENTS

| Number | Name | Date |
|---|---|---|
| 1,112,282 | Fortescue | Sept. 29, 1914 |
| 1,225,639 | Johannesen | May 8, 1917 |
| 1,305,360 | Holslag | June 3, 1919 |
| 1,618,497 | Waters | Feb. 22, 1927 |
| 1,874,508 | Gronau | Aug. 30, 1932 |
| 2,085,242 | Weaver | June 29, 1937 |
| 2,243,169 | Schwenden | May 27, 1941 |

Certificate of Correction

August 24, 1948.

Patent No. 2,447,955.

RAYMOND A. MILLHOLLAND ET AL.

It is hereby certified that error appears in the printed specification of the above numbered patent requiring correction as follows:

Column 6, line 20, for "on-load" read *no-load*;

and that the said Letters Patent should be read with this correction therein that the same may conform to the record of the case in the Patent Office.

Signed and sealed this 7th day of December, A. D. 1948.

[SEAL]

THOMAS F. MURPHY,
*Assistant Commissioner of Patents.*